(12) United States Patent
Yeh et al.

(10) Patent No.: US 8,570,742 B2
(45) Date of Patent: Oct. 29, 2013

(54) ENCLOSURE OF AN ELECTRONIC DEVICE

(75) Inventors: Chin-Wen Yeh, Tu-Cheng (TW); Yang Xiao, Shenzhen (CN); Kai Pei, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 280 days.

(21) Appl. No.: 13/152,400

(22) Filed: Jun. 3, 2011

(65) Prior Publication Data
US 2012/0103565 A1 May 3, 2012

(30) Foreign Application Priority Data
Nov. 3, 2010 (CN) .......................... 2010 1 0530653

(51) Int. Cl.
H05K 7/20 (2006.01)

(52) U.S. Cl.
USPC ........................ 361/695; 361/679.48; 361/709

(58) Field of Classification Search
USPC ..................... 361/695, 709, 679.48
See application file for complete search history.

(56) References Cited

U.S. PATENT DOCUMENTS

| | | | |
|---|---|---|---|
| 5,943,209 A * | 8/1999 | Liu | 361/695 |
| 6,172,872 B1 * | 1/2001 | Katsui | 361/695 |
| 6,330,905 B1 * | 12/2001 | Lin et al. | 165/80.3 |
| 6,351,380 B1 * | 2/2002 | Curlee et al. | 361/695 |
| 6,401,806 B1 * | 6/2002 | Lee et al. | 165/80.3 |
| 6,449,152 B1 * | 9/2002 | Lin | 361/697 |
| 6,466,443 B1 * | 10/2002 | Chen | 361/695 |
| 6,525,941 B1 * | 2/2003 | Lai | 361/697 |
| 6,640,884 B1 * | 11/2003 | Liu | 165/80.3 |
| 6,672,374 B1 * | 1/2004 | Lin | 165/121 |
| 6,822,864 B2 * | 11/2004 | Huang et al. | 361/697 |
| 6,894,898 B2 * | 5/2005 | Liu | 361/697 |
| 6,924,984 B2 * | 8/2005 | Lee et al. | 361/704 |
| 6,950,306 B2 * | 9/2005 | Huang et al. | 361/697 |
| 7,133,288 B2 * | 11/2006 | DelPrete et al. | 361/719 |
| 7,269,010 B2 * | 9/2007 | Yu et al. | 361/697 |
| 7,391,611 B2 * | 6/2008 | Ko et al. | 361/695 |
| 7,405,933 B2 * | 7/2008 | Kobayashi et al. | 361/695 |
| 7,558,067 B2 * | 7/2009 | Lin | 361/710 |
| 7,746,652 B2 * | 6/2010 | Horng et al. | 361/719 |
| 7,835,149 B2 * | 11/2010 | Li et al. | 361/679.49 |
| 8,395,895 B2 * | 3/2013 | Yoon | 361/695 |
| 2008/0013280 A1 * | 1/2008 | Horng et al. | 361/704 |
| 2009/0154115 A1 * | 6/2009 | Yeh et al. | 361/752 |

* cited by examiner

*Primary Examiner* — Anatoly Vortman
(74) *Attorney, Agent, or Firm* — Altis & Wispro Law Group, Inc.

(57) ABSTRACT

An enclosure includes a case and a cover. The case includes a heat generating device and a bracket mounted therein. The bracket defines an engaging hole. A heat dissipating module is located in the engaging hole and contacts the heat generating device. The cover includes a number of mounting poles pivotally mounted thereon. The cover is mounted on the case. The mounting poles are engaged on the bracket to enclose the heat dissipating module.

17 Claims, 5 Drawing Sheets

ENCLOSURE OF AN ELECTRONIC DEVICE

BACKGROUND

1. Technical Field

The present disclosure relates to enclosures of electronic devices, and particularly to an enclosure which can conveniently and firmly secure a heat dissipating module therein.

2. Description of Related Art

Many electronic devices, such as personal computers, include a central processing unit (CPU) and a power supply. Heat generated by the CPU is removed by a fan attached to the CPU. However, the fan is usually mounted on the CPU by screws, and it is tedious and time-consuming to use screws to attach or detach the fan.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
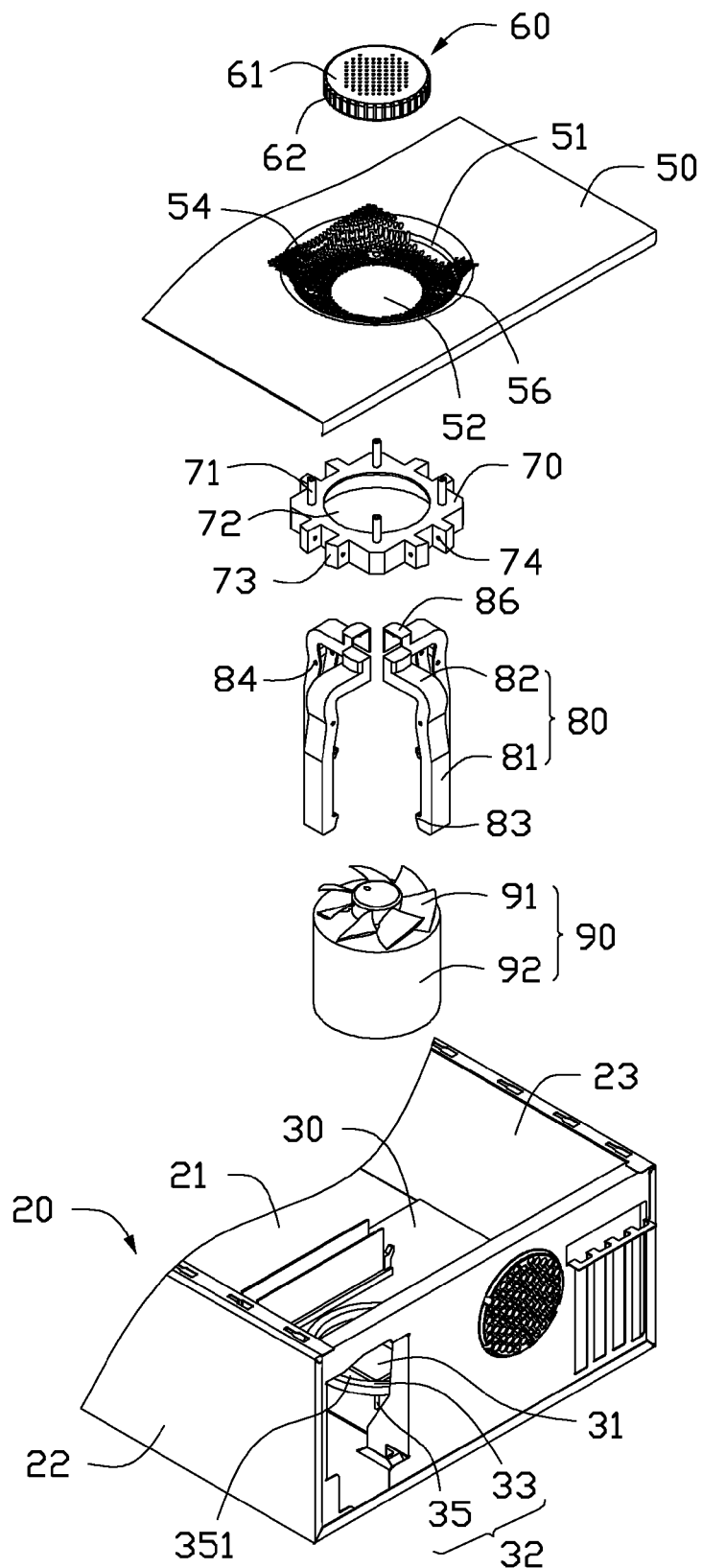
FIG. 1 is an exploded and isometric view of an embodiment of an enclosure of an electronic device.

Referring to FIG. 1, an enclosure of an electronic device in accordance with an embodiment, includes a case 20, a cover 50, a rotating member 60, a engaging member 70, four mounting poles 80, and a heat dissipating module 90.

The case 20 includes a bottom wall 21 and a plurality of sidewalls 22 perpendicularly connected to the bottom wall 21. An opening 23 is surrounded by the plurality of sidewalls 22. A circuit board 30 is secured to the bottom wall 21. A heat generating device 31 and a bracket 32 are mounted on the circuit board 30. In one embodiment, the heat generating device 31 is a central process unit. The bracket 32 includes a plurality of stand portions 35 and an encircled portion 33. The stand portions 35 are secured on the circuit board 30 and surround the heat generating device 31. The encircled portion 33 is connected to top ends of the stand portions 35. The encircled portion 33 defines an engaging hole 351. The engaging hole 351 is located above the heat generating device 31.

The cover 50 can be mounted on the case 20 to shield the opening 23. The cover 50 defines a recessed portion 51. A central portion of the recessed portion 51 defines a first through hole 52. A plurality of first vent holes 54 is defined in the recessed portion 51 surrounding the first through hole 52. Four securing holes 56 are defined in the recessed portion 51.

Figure 2:
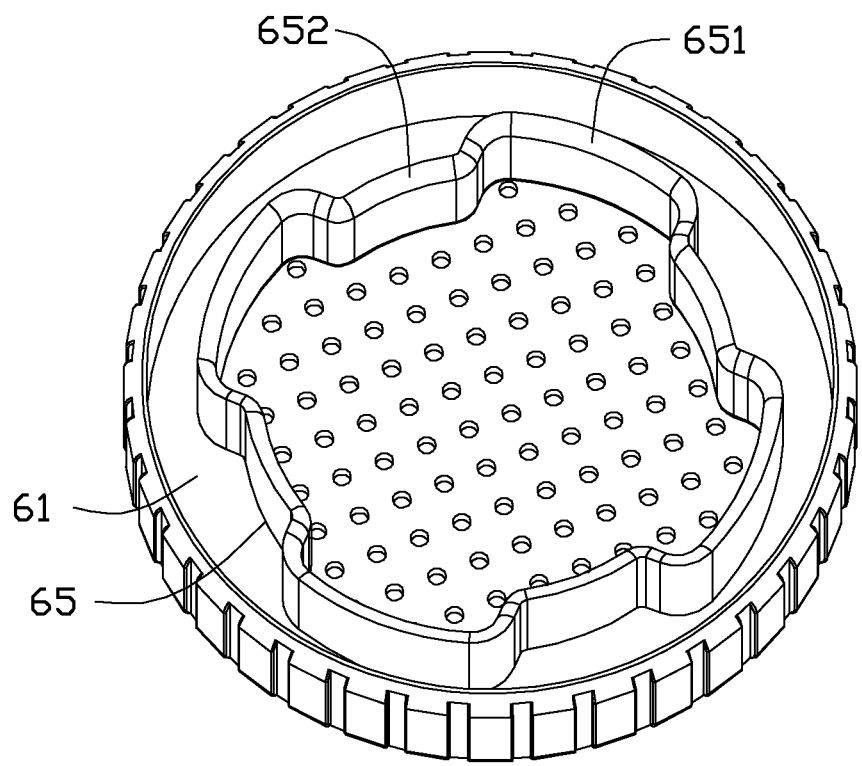
FIG. 2 is an isometric view of a rotating member of the enclosure of FIG. 1.
Figure 3:
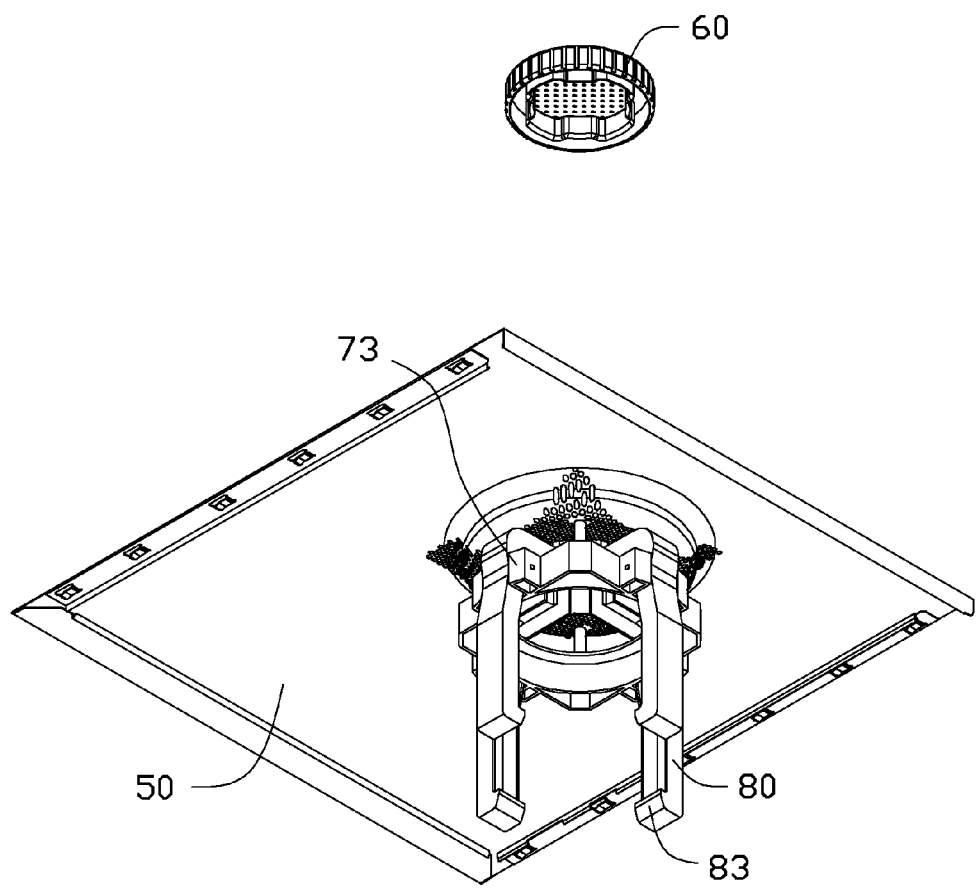
FIG. 3 is a pre-assembled view of the enclosure of FIG. 1.
Figure 4:
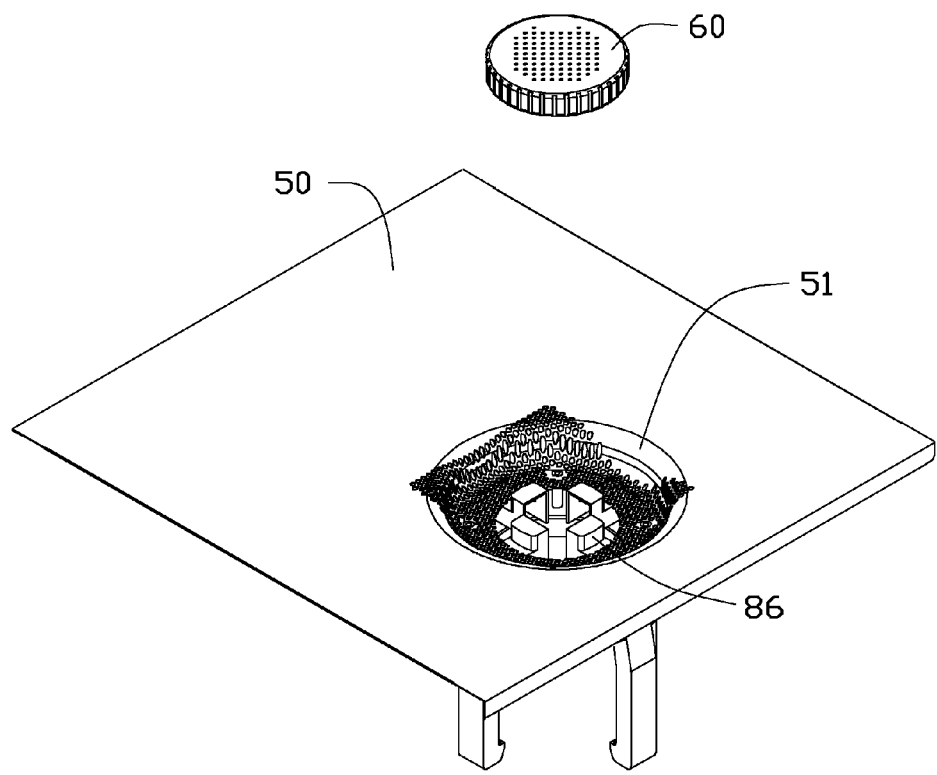
FIG. 4 is similar to FIG. 3, but viewed from another aspect.
Figure 5:
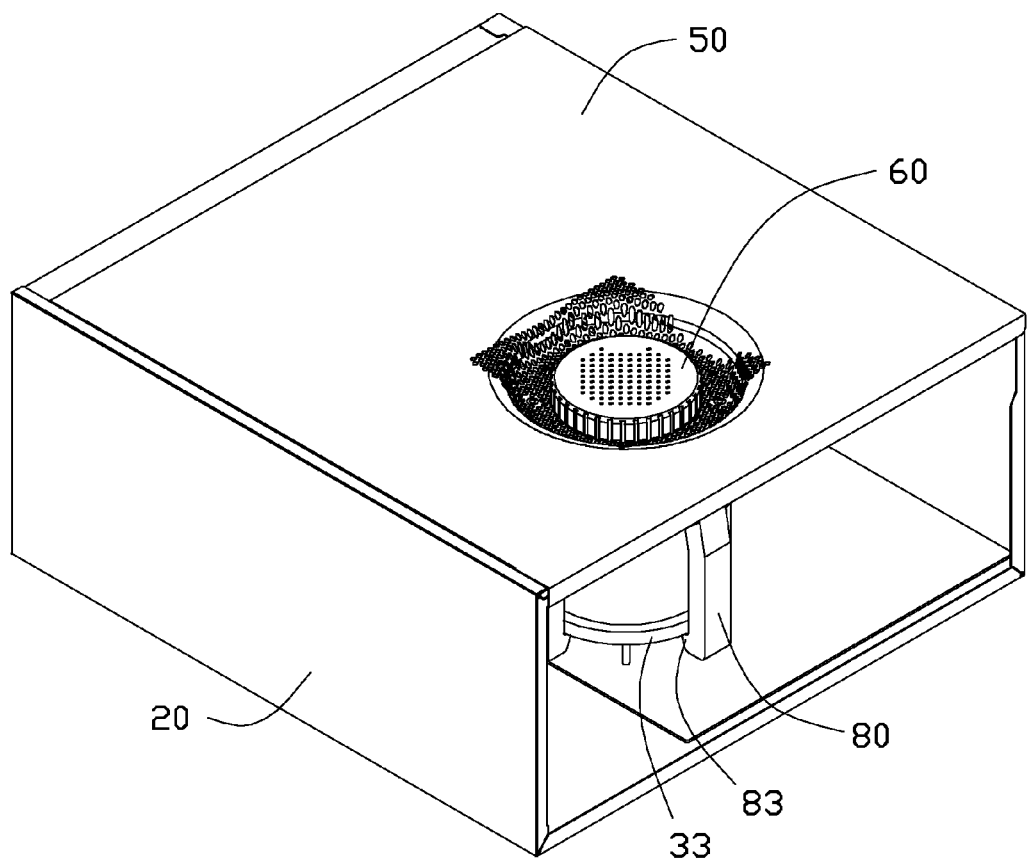
FIG. 5 is an assembled view of the enclosure of FIG. 4.

Referring to FIGS. 1 and 2, the rotating member 60 includes a circular shield piece 61 which is used to cover the first through hole 52. Edges of the shield piece 61 form a flange 62 thereon. The flange 62 includes a plurality of ribs for conveniently clasping the rotating member 60. A flexible bar 65 is located on a side of the shield piece 61 which faces the cover 50. The bar 65 includes four release portions 651 and four pressing portions 652. Two adjacent release portions 651 are separated by a pressing portion 652. Two adjacent pressing portions 652 are separated by a release portion 651.

The engaging member 70 defines a second through hole 72. The engaging member 70 includes four securing posts 71 corresponding to the four securing holes 56 of the cover 50. The engaging member 70 includes four pairs of blocks 73. Each block 73 defines a first pivot hole 74 therein.

Each mounting pole 80 includes an upright first pole portion 81 and a horizontal second pole portion 82. The second pole portion 82 is connected to a top end of the first pole portion 81. A hook 83 is connected to a bottom end of the first pole portion 81. A head portion 86 is connected to a free end of the second pole portion 82. The first pole portion 81 defines a second pivot hole 84.

The heat dissipating module 90 includes a heat sink 92 and a fan 91. The heat sink 92 is cylindrical. The fan 91 is mounted on a top side of the heat sink 92.

Referring to FIGS. 1 to 5, in assembly of the enclosure, the four mounting poles 80 are positioned between the four pairs of blocks 73. The second pivot hole 84, of each mounting pole 80, is aligned with the first pivot holes 74 of the corresponding pair of blocks 73. A pivot (not shown) is inserted in the first pivot holes 74 and the second pivot hole 84. Therefore, the mounting poles 80 are pivotably mounted on the engaging member 70. At this position, the head portions 86 of the four mounting poles 80 are located above the second through hole 72 of the engaging member 70.

Then, the four securing posts 71 of the engaging member 70 are fixed in the four securing holes 56 of the cover 50. The second through hole 72 is in alignment with the first through hole 52. The head portions 86 of the four mounting poles 80 are inserted in the first through hole 52. The shield piece 61 of the rotating member 60 is covered on the first through hole 52. The head portions 86 of the four mounting poles 80 are located in the release portion 651 of the bar 65.

The heat sink 92 is placed in the engaging hole 351. A bottom of the heat sink 92 contacts the heat generating device 31. Then, the cover 50 is moved towards the opening 23. The rotating member 60 rotates to make the pressing portions 652 abut against the head portions 86. The mounting poles 80 rotate on the engaging member 70. The hooks 83 of the mounting poles 80 expand outwards. Then, the hooks 83 are located outside of the encircled portion 33. In succession, the rotating member 60 rotates to make the release portion 651 receive the head portion 86. The mounting poles 80 rotate on the engaging member 70. The hooks 83 of the mounting poles 80 are retracted to engage the encircled portion 33. Therefore, the heat dissipating module 90 is enclosed among the four mounting poles 80. Lastly, the cover 50 is mounted on the case 20.

When the heat dissipating module 90 needs to be detached from the cover 50, the rotating member 60 rotates to make the pressing portions 652 abut against the head portions 86. The mounting poles 80 rotate on the engaging member 70. The hooks 83 expand outwards and are disengaged from the encircled portion 33. After the cover 50 is detached from the case 20, the heat dissipating module 90 can be removed from the engaging hole 351 of the bracket 32.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An enclosure, comprising:
a case comprising a heat generating device and a bracket mounted therein, the bracket defining an engaging hole, a heat dissipating module located in the engaging hole and contacts the heat generating device; and
a cover comprising a plurality of mounting poles pivotally mounted thereon, wherein the cover is mounted on the case, and the plurality of mounting poles are engaged on the bracket to enclose the heat dissipating module;
wherein the cover defines a first through hole, an engaging member is mounted on the cover, the engaging member defines a second through hole which is in alignment with the first through hole; each of the plurality of mounting poles is pivotally mounted on the engaging member, each of the plurality of mounting poles comprises a head portion and a hook, the head portion is located in the first through hole, and the hook is clasped on the bracket.

2. The enclosure of claim 1, wherein the cover defines a recessed portion, the first through hole is defined in the recessed portion, a plurality of first vent holes is defined in the recessed portion and surrounds the first through hole.

3. The enclosure of claim 2, wherein a plurality of securing holes is defined in the recessed portion, the engaging member comprises a plurality of securing posts, and the plurality of securing posts is mounted in the plurality of securing holes.

4. The enclosure of claim 1, wherein the engaging member comprises a plurality of pairs of blocks, each pair of blocks defines a pair of first pivot holes; and each of the plurality of mounting poles defines a second pivot hole which is aligned with the pair of first pivot holes.

5. The enclosure of claim 1, wherein the cover comprises a rotating member rotatably mounted on the first through hole, the rotating member comprises a flexible bar, the flexible bar comprises a plurality of release portions and a plurality of pressing portions, the rotating member is adapted to rotate between a first position and a second position, in the first position, one of the plurality of pressing portions abuts the head portion; and in the second position, one of the plurality of release portions receives the head portion placed therein.

6. The enclosure of claim 5, wherein two adjacent release portions of the plurality of release portions are separated by one of the plurality of pressing portions, and two adjacent pressing portions of the plurality of pressing portions are separated by one of the plurality of release portions.

7. The enclosure of claim 5, wherein the hook is adapted to clasp on the bracket when the head portion is received in one of the plurality of pressing portions, and the hook is adapted to be disengaged from the bracket when one of the plurality of pressing portions abuts the head portion.

8. The enclosure of claim 1, wherein the bracket comprises a plurality of stand portions and an encircled portion, the plurality of stand portions is secured on the case and surrounds the heat generating device, the encircled portion is connected to the plurality of stand portions, and the engaging hole is defined in the encircled portion.

9. An enclosure, comprising:
a case comprising a heat generating device mounted therein; and
a cover comprising a plurality of mounting poles pivotally mounted thereon, each of the plurality of mounting poles comprising a head portion and a hook, a first through hole defined in the cover, and the head portion is located in the first through hole; wherein the cover is mounted to the case, and the head portion is adapted to move in the first through hole between an engagement position and a disengagement position, in the engagement position, the hook is driven to engage on the case, and in the disengagement position, the hook is disengaged from the case;
wherein the cover defines a recessed portion, and the first through hole is defined in the recessed portion; and a plurality of first vent holes is defined in the recessed portion and surrounds the first through hole.

10. The enclosure of claim 9, wherein the case comprises a bracket mounted therein, the bracket defines an engaging hole, a heat dissipating module is located in the engaging hole and contacts the heat generating device, and the hook is clasped on the bracket to enclose the heat dissipating module among the plurality of mounting poles in the engagement position.

11. The enclosure of claim 10, wherein an engaging member is mounted on the cover, the engaging member defines a second through hole which is in alignment with the first through hole; each of the plurality of mounting poles is pivotally mounted on the engaging member.

12. The enclosure of claim 9, wherein a plurality of securing holes is defined in the recessed portion, the engaging member comprises a plurality of securing posts, and the plurality of securing posts is mounted in the plurality of securing holes.

13. The enclosure of claim 11, wherein the engaging member comprises a plurality of pairs of blocks, each of the plurality of pair of blocks defines a pair of first pivot holes; and each of the plurality of mounting poles defines a second pivot hole, which is aligned with the pair of first pivot holes.

14. The enclosure of claim 10, wherein the cover comprises a rotating member rotatably mounted on the first through hole, and the rotating member comprises a flexible bar, the flexible bar comprises a plurality of release portions and a plurality of pressing portions, the rotating member is adapted to rotate between a first position and a second position, in the first position, one of the plurality of pressing portions abuts the head portion; and in the second position, one of the plurality of release portions receives the head portion placed therein.

15. The enclosure of claim 14, wherein two adjacent release portions of the plurality of release portions are separated by one of the plurality of pressing portions, and two adjacent pressing portions of the plurality of pressing portions are separated by one of the plurality of release portions.

16. The enclosure of claim 14, wherein the hook is adapted to clasp on the bracket when the head portion is located in the second position, and the hook is adapted to be disengaged from the bracket when the head portion is located in the first position.

17. The enclosure of claim 10, wherein the bracket comprises a plurality of stand portions and an encircled portion, the plurality of stand portions is secured on the case and surrounds the heat generating device, the encircled portion is connected to the plurality of stand portions, and the engaging hole is defined in the encircled portion.

* * * * *